United States Patent
Harada

(10) Patent No.: US 12,047,960 B2
(45) Date of Patent: Jul. 23, 2024

(54) TERMINAL, RADIO COMMUNICATION METHOD, AND BASE STATION PERFORMING RADIO LINK MONITORING

(71) Applicant: NTT DOCOMO, INC., Tokyo (JP)

(72) Inventor: Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 219 days.

(21) Appl. No.: 16/768,948

(22) PCT Filed: Dec. 4, 2017

(86) PCT No.: PCT/JP2017/043530
§ 371 (c)(1),
(2) Date: Jun. 2, 2020

(87) PCT Pub. No.: WO2019/111301
PCT Pub. Date: Jun. 13, 2019

(65) Prior Publication Data
US 2021/0227568 A1 Jul. 22, 2021

(51) Int. Cl.
*H04W 72/23* (2023.01)
*H04L 5/00* (2006.01)
*H04W 72/0453* (2023.01)

(52) U.S. Cl.
CPC .......... *H04W 72/23* (2023.01); *H04L 5/0048* (2013.01); *H04L 5/0094* (2013.01); *H04W 72/0453* (2013.01)

(58) Field of Classification Search
CPC ......... H04W 72/1289; H04W 72/0453; H04W 72/042; H04W 48/12; H04W 72/23; H04L 5/0048; H04L 5/0094
See application file for complete search history.

(56) References Cited

U.S. PATENT DOCUMENTS

| | | | |
|---|---|---|---|
| 2015/0078271 A1 | 3/2015 | Kim et al. | |
| 2018/0338253 A1* | 11/2018 | Nagaraja | H04L 5/001 |
| 2019/0182000 A1* | 6/2019 | Futaki | H04L 5/0053 |
| 2020/0274657 A1* | 8/2020 | Deenoo | H04L 1/0021 |
| 2020/0344019 A1* | 10/2020 | Da Silva | H04W 24/04 |

FOREIGN PATENT DOCUMENTS

JP 2015-532813 A 11/2015

OTHER PUBLICATIONS

3GPP TSG RAN WG1 NR Ad-Hoc#2; R1-1711187 "Advanced Grant Indication for UE Power Saving" Qualcomm Incorporated; Qingdao, P.R. China; Jun. 27-30, 2017 (5 pages).
(Continued)

*Primary Examiner* — Justin T Van Roie
(74) *Attorney, Agent, or Firm* — Osha Bergman Watanabe & Burton LLP

(57) ABSTRACT

To prevent a communication throughput and/or communication quality from lowering even when one or more partial bands are configured in a carrier, one aspect of a user terminal according to the present invention includes: a receiving section that receives a downlink signal in one of a plurality of partial bands that are configurable in a carrier; and a control section that controls reception of a reference signal for radio link monitoring configured per the plurality of partial bands.

8 Claims, 11 Drawing Sheets

(56) References Cited

OTHER PUBLICATIONS

3GPP TSG RAN WG4 Meeting NR #85; R4-1713013 "Discussion on requirements of Radio link monitoring" NTT Docomo, Inc.; Reno, Nevada, US; Nov. 27-Dec. 1, 2017 (3 pages).
3GPP TSG-RAN WG2 #100; Tdoc R2-1713733 "BWP and RLM in NR" Ericsson; Reno, USA; Nov. 27-Dec. 1, 2017 (3 pages).
3GPP TSG-RAN WG2 #99bis; R2-1711404 "RLM/RLF for bandwidth part" Samsung; Prague, Czech; Oct. 9-13, 2017 (3 pages).
Extended European Search Report issued in European Application No. 17934199.5, dated Jun. 21, 2021 (8 pages).
International Search Report issued in Application No. PCT/JP2017/043530, mailed on Feb. 20, 2018 (5 pages).
Written Opinion issued in International Publication No. PCT/JP2017/043530, mailed on Feb. 20, 2018 (5 pages).
3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).
3GPP TSG-RAN WG2#99bis; R2-1710578; "BWP impact on RRM measurement;" Huawei, HiSilicon; Oct. 9-13, 2017; Prague, Czech Republic (3 pages).
3GPP TSG RAN WG1 Meeting #91; R1-1720797; "Remaining details on Radio link monitoring for mobility management;" NTT Docomo, Inc.; Nov. 27-Dec. 1, 2017; Reno, USA (5 pages).
3GPP TSG RAN WG1 Meeting 91; R1-1720338; "On timing between DCI indicating active BWP switching and active BWP switching;" Samsung; Nov. 27-Dec. 1, 2017; Reno, USA (4 pages).
Office Action issued for Japanese Application No. 2019-557724 on Mar. 1, 2022 (6 pages).
Samsung, "RLF signalling for BWP", 3GPP TSG-RAN WG2 #100, R2-1713860, Reno, Nevada, Nov. 27-Dec. 1, 2017 (3 pages).
Ericsson, "BWP and RLM in NR", 3GPP TSG-RAN WG2 #100, Tdoc R2-17xxxxx (R2-1713733), Reno, USA, Nov. 27-Dec. 1, 2017 (3 pages).
Office Action issued in counterpart Chinese Patent Application No. 201780098261.3 mailed on Oct. 7, 2023 (12 pages).

\* cited by examiner

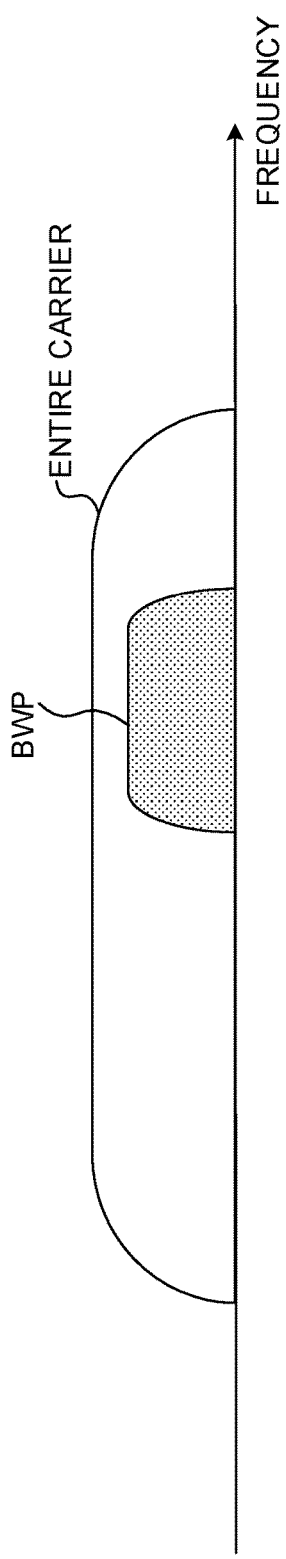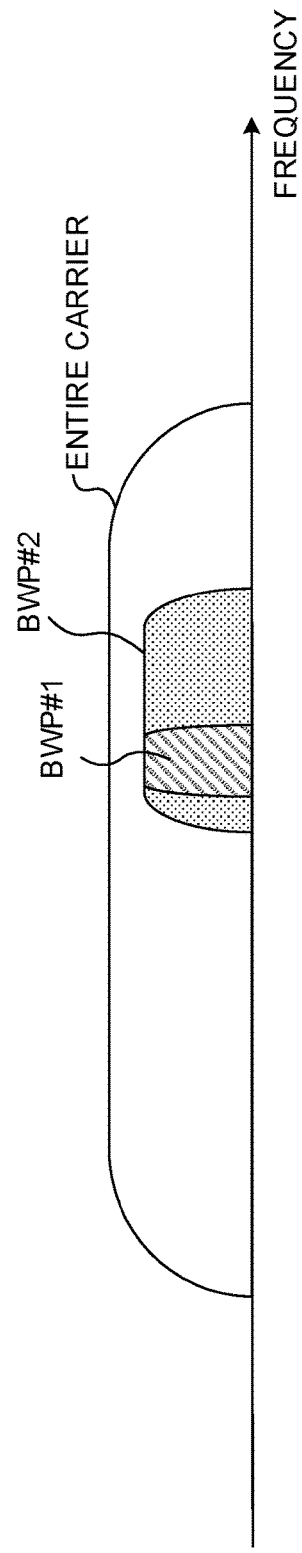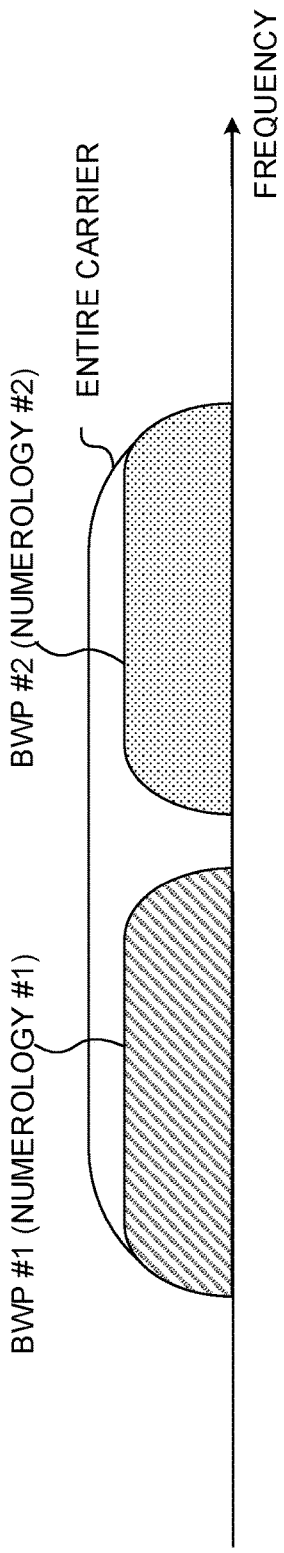

TERMINAL, RADIO COMMUNICATION METHOD, AND BASE STATION PERFORMING RADIO LINK MONITORING

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of wider bands and a higher speed than those of LTE, LTE successor systems (also referred to as, for example, LTE Advanced (LTE-A), Future Radio Access (FRA), 4G, 5G, 5G+ (plus), New RAT (NR), and LTE Rel. 14 and 15~) have been also studied.

Furthermore, legacy LTE systems (e.g., LTE Rel. 8 to 13) perform communication on Downlink (DL) and/or Uplink (UL) by using subframes of 1 ms as a scheduling unit. The subframe includes 14 symbols of 15 kHz in subcarrier-spacing in a case of, for example, a Normal Cyclic Prefix (NCP). The subframe is also referred to as, for example, a Transmission Time Interval (TTI).

Furthermore, a user terminal (UE: User Equipment) controls reception of a DL data channel (also referred to as, for example, a PDSCH: Physical Downlink Shared Channel or a DL shared channel) based on Downlink Control Information (DCI) (also referred to as, for example, a DL assignment) from a radio base station (e.g., eNB: eNodeB). Furthermore, the user terminal controls transmission of a UL data channel (also referred to as, for example, a PUSCH: Physical Uplink Shared Channel or a UL shared channel) based on DCI (also referred to as, for example, a UL grant) from the radio base station.

Furthermore, the legacy LTE systems perform monitoring of radio link quality (Radio Link Monitoring (RLM)). When a Radio Link Failure (RLF) is detected by the RLM, re-establishment of Radio Resource Control (RRC) connection is requested to the user terminal (UE: User Equipment).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

A future radio communication system (e.g., NR) is also assumed to perform Radio Link Monitoring (RLM) for detecting a Radio Link Failure (RLF).

Furthermore, it has been studied for the future radio communication system to use one or more partial frequency bands (also referred to as, for example, partial bands or Bandwidth Parts (BWPs)) in a carrier (also referred to, for example, a Component Carrier (CC) or a system band) for DL and/or UL communication (DL/UL communication).

However, when one or more partial bands (e.g., BWPs) are configured in a carrier, a problem is how to configure, for example, a reference signal used for radio link monitoring. Thus, study on how to control radio link monitoring when the one or more partial bands are configured in the carrier has not advanced yet. When the partial bands are not appropriately configured and/or radio link monitoring is not appropriately performed, there is a risk that a communication throughput and/or communication quality deteriorate.

It is therefore one of objects of the present disclosure to provide a user terminal and a radio communication method that can prevent a communication throughput and/or communication quality from lowering even when one or more partial bands are configured in a carrier.

Solution to Problem

One aspect of a user terminal according to the present invention includes: a receiving section that receives a downlink signal in one of a plurality of partial bands that are configurable in a carrier; and a control section that controls reception of a reference signal for radio link monitoring configured per the plurality of partial bands.

Advantageous Effects of Invention

According to the present invention, it is possible to prevent a communication throughput and/or communication quality from lowering even when one or more partial bands are configured in a carrier.

BRIEF DESCRIPTION OF DRAWINGS

FIGS. 1A to 1C are diagrams illustrating one example of a BWP configuration scenario.

DESCRIPTION OF EMBODIMENTS

Figure 2:
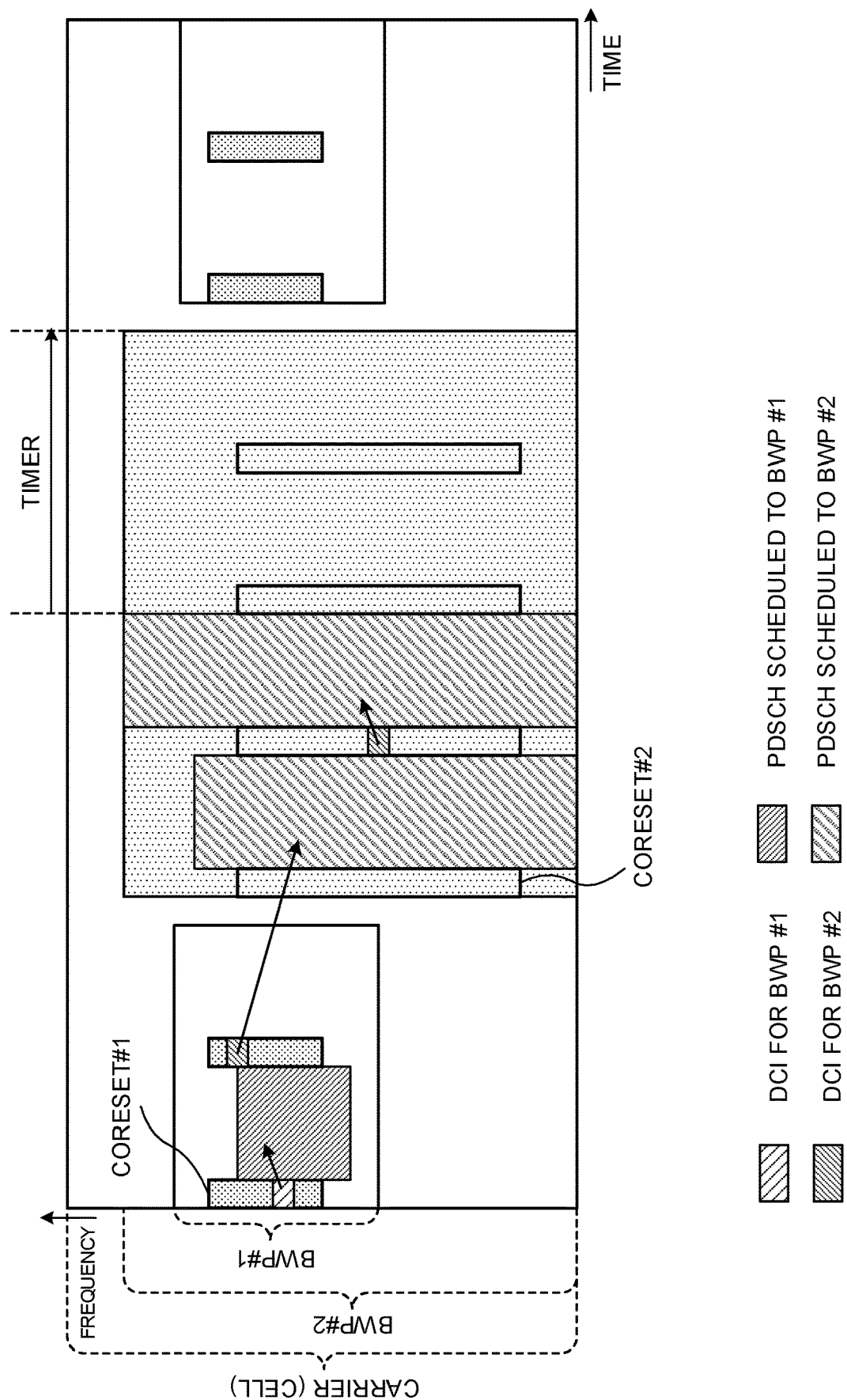
FIG. 2 is a diagram illustrating one example of control of activation/deactivation of a BWP.

It has been studied for a future radio communication system (e.g., NR, 5G or 5G+) to allocate a carrier (also referred to as, for example, a Component Carrier (CC), a cell or a system band) of a wider bandwidth (e.g., 100 to 800 MHz) than those of legacy LTE systems (e.g., LTE Rel. 8 to 13).

On the other hand, the future radio communication system is assumed to include a mix of user terminals (also referred to as, for example, Wideband (WB) UEs or single carrier WB UEs) that have capability for performing transmission and/or reception (transmission/reception) in the entire carrier, and user terminals (also referred to as, for example, BW reduced UEs) that do not have capability for performing transmission/reception in the entire carrier.

Thus, the future radio communication system is assumed to include a mix of a plurality of user terminals of different supporting bandwidths (various BW UE capabilities). Therefore, it has been studied to semi-statically configure one or more partial frequency bands in a carrier. Each frequency band (e.g., 50 MHz or 200 MHz) in the carrier will be referred to as, for example, a partial band or a Bandwidth Part (BWP).

FIG. 1 is a diagram illustrating one example of a BWP configuration scenario. FIG. 1A illustrates a scenario (usage scenario #1) that 1 BWP is configured to a user terminal in 1 carrier. In, for example, FIG. 1A, a BWP of 200 MHz is configured in the carrier of 800 MHz. Activation or deactivation of the BWP may be controlled.

In this regard, activation of the BWP refers to a state where the BWP is available (or refers to making a transition to the available state), and will be also referred to as, for example, activation or enabling of configuration information of a BWP (BWP configuration information). Furthermore, deactivation of the BWP refers to a state where the BWP is unavailable (or refers to making a transition to the unavailable state), and will be also referred to as, for example, deactivation or disabling of the BWP configuration information.

FIG. 1B illustrates a scenario (usage scenario #2) that a plurality of BWPs are configured to the user terminal in 1 carrier. As illustrated in FIG. 1B, at least part of a plurality of these BWPs (e.g., BWPs #1 and #2) may overlap. In, for example, FIG. 1B, the BWP #1 is a frequency band that is part of the BWP #2.

Furthermore, activation or deactivation of at least one of a plurality of these BWPs may be controlled. Furthermore, the number of BWPs to be activated at a certain time may be restricted (e.g., only 1 BWP may be active at the certain time). For example, in FIG. 1B, only one of the BWPs #1 and #2 is active at the certain time.

In, for example, FIG. 1B, when data is not transmitted or received, the BWP #1 may be activated, and, when data is transmitted or received, the BWP #2 may be activated. More specifically, when there is data to be transmitted or received, the BWP #1 may be switched to the BWP #2, and, when transmission or reception of the data is finished, the BWP #2 may be switched to the BWP #1. Consequently, the user terminal does not need to monitor the BWP #2 at all times, so that it is possible to suppress power consumption.

In addition, in FIGS. 1A and 1B, a network (e.g., radio base station) may not assume that the user terminal performs reception and/or transmission outside a BWP in an active state. In addition, in FIG. 1A, the user terminal that supports the entire carrier is not prevented from receiving and/or transmitting a signal outside the BWP at all.

FIG. 1C illustrates a scenario (usage scenario #3) that a plurality of BWPs are configured to different bands in 1 carrier. As illustrated in FIG. 1C, different numerologies may be applied to a plurality of these BWPs. In this regard, the numerology may be at least one of a subcarrier-spacing, a symbol length, a slot length, a Cyclic Prefix (CP) length, a slot (Transmission Time Interval (TTI)) length, and the number of symbols per slot.

In, for example, FIG. 1C, the BWPs #1 and #2 of the different numerologies are configured to the user terminal having capability for performing transmission/reception in the entire carrier. In FIG. 1C, at least one BWP configured to the user terminal may be activated or deactivated, and one or more BWPs may be active at a certain time.

In addition, a BWP used for DL communication may be referred to as a DL BWP (DL frequency band), and a BWP used for UL communication may be referred to as a UL BWP (UL frequency band). At least part of frequency bands of the DL BWP and the UL BWP may overlap. Hereinafter, the DL BWP and the UL BWP will be collectively referred to as a BWP when not distinguished.

At least one of DL BWPs (e.g., a DL BWP included in a primary CC (or a PCell or a PSCell)) configured to the user terminal may include a control domain including a candidate resource to which a DL control channel (DCI) is allocated. The control domain may be referred to as a Control Resource Set (CORESET), a control resource domain, a control subband, a search space set, a search space resource set, a controlling subband or an NR-PDCCH domain The user terminal monitors one or more search spaces in the CORESET, and detects DCI for the user terminal. The search space may include a Common Search Space (CSS) in which DCI (e.g., group DCI or common DCI) that is common between one or more user terminals is arranged, and/or a User terminal (UE)-specific Search Space (USS: UE-specific Search Space) in which user terminal-specific DCI (e.g., a DL assignment and/or a UL grant) is arranged.

Control of activation and/or deactivation (also referred to as, for example, activation/deactivation or switching) of a BWP will be described with reference to FIG. 2. FIG. 2 is a diagram illustrating one example of control of activation/deactivation of the BWP. In addition, FIG. 2 assumes the scenario illustrated in FIG. 1B. However, control of activation/deactivation of the BWP is applicable to, for example, the scenarios illustrated in FIGS. 1A and 1C, too, as appropriate.

Furthermore, in FIG. 2, a CORESET #1 is configured in the BWP #1, and a CORESET #2 is configured in the BWP #2. One or more search spaces are respectively provided for the CORESET #1 and the CORESET #2. For example, DCI for the BWP #1 and DCI for the BWP #2 may be arranged in an identical search space or may be arranged in respectively different search spaces in the CORESET #1. Furthermore, in FIG. 2, when the BWP #1 is in an active state, the user terminal monitors (blind-decodes) the search space in the CORESET #1 of a given periodicity (e.g., per one or more slots, per one or more mini slots or per given number of symbols), and detects DCI for the user terminal.

The DCI may include information (BWP information) indicating which BWP the DCI is for. The BWP information may be, for example, a BWP index and a given field value in the DCI. The user terminal may determine a BWP to which a PDSCH or a PUSCH is scheduled by DCI based on the BWP information in the DCI.

When detecting the DCI for the BWP #1 in the CORESET #1, the user terminal receives the PDSCH scheduled (allocated) to given time and/or frequency resources (time/frequency resources) in the BWP #1 based on the DCI for the BWP #1.

Furthermore, when detecting the DCI for the BWP #2 in the CORESET #1, the user terminal deactivates the BWP #1, and activates the BWP #2. The user terminal receives the PDSCH scheduled to the given time/frequency resources of the DL BWP #2 based on the DCI for the BWP #2 detected in the CORESET #1.

In addition, in FIG. 2, the DCI for the BWP #1 and the DCI for the BWP #2 are detected in the CORESET #1 at different timings. However, a plurality of pieces of DCI of different BWPs may be made detectable at an identical timing. For example, a plurality of search spaces respectively associated with a plurality of BWPs in the CORESET #1 may be provided, and a plurality of pieces of DCI of respectively different BWPs may be transmitted in a plurality of these search spaces. The user terminal may monitor a plurality of search spaces in the CORESET #1, and detect a plurality of pieces of DCI of different BWPs at an identical timing.

When the BWP #2 is activated, the user terminal monitors (blind-decodes) the search space in the CORESET #2 of a given periodicity (e.g., per one or more slots, per one or more mini slots or per given number of symbols), and detects the DCI for the BWP #2. The user terminal may receive the PDSCH scheduled to the given time/frequency resources of the BWP #2 based on the DCI for the BWP #2 detected in the CORESET #2.

In addition, FIG. 2 illustrates a given time for switching between activation and deactivation. However, the given time may not be provided.

When detection of the DCI for the BWP #2 in the CORESET #1 triggers activation of the BWP #2 as illustrated in FIG. 2, it is possible to activate the BWP #2 without explicit instruction information, and consequently prevent an increase in an overhead accompanying control of activation.

On the other hand, in FIG. 2, even when the user terminals fails (misses) detection of the DCI for the BWP #2 in the CORESET #1 (i.e., the DCI for activation of the BWP #2), the radio base station cannot recognize the failure of the detection. Hence, even though the user terminal continues monitoring the CORESET #1 of the BWP #1, there is a risk that the radio base station erroneously recognizes that the BWP #2 is available for the user terminal, and transmits, in the CORESET #2, DCI for scheduling PDSCH in the BWP #2.

In this case, when the radio base station cannot receive transmission acknowledgement information (also referred to as, for example, HARQ-ACK, ACK/NACK or A/N) of the PDSCH in the given duration, the radio base station may recognize that the user terminal has failed detection of the DCI for activation of the BWP #2, and retransmit the DCI for activation in the CORESET #1. Alternatively, although not illustrated in FIG. 2, a common CORESET may be provided to the BWPs #1 and #2.

Furthermore, when a data channel (e.g., the PDSCH and/or the PUSCH) is not scheduled in the activated BWP for a given duration, the BWP may be deactivated. In, for example, FIG. 2, the PDSCH is not scheduled in the DL BWP #2 for the given duration, and therefore the user terminal deactivates the BWP #2 and activates the BWP #1.

The user terminal may configure a timer in an activated BWP every time reception of a data channel (e.g., a PDSCH and/or a PUSCH) is finished, and deactivate the BWP when the timer expires. The timer may be a timer (also referred to as, for example, a joint timer) that is common between DL BWPs and UL BWPs, or may be a dedicated timer.

When the timer is used for deactivation of a BWP, it is not necessary to transmit explicit instruction information for deactivation, so that it is possible to reduce an overhead accompanying control of deactivation.

A maximum number of BWPs that is configurable per carrier may be defined in advance. According to, for example, Frequency Division Diplex (FDD) (paired spectrum), four DL BWPs at maximum and four UL BWPs at maximum may be respectively configured per carrier.

On the other hand, according to Time Division Duplex (TDD) (unpaired spectrum), four pairs of DL BWPs and UL BWPs at maximum may be configured per carrier. In this regard, according to TDD, the DL BWP and the UL BWP that form a pair may have an identical center frequency and different bandwidths.

A single carrier has been described above. However, a plurality of carriers (also referred to as, for example, cells or serving cells) may be aggregated (e.g., Carrier Aggregation (CA) and/or Dual Connectivity (DC)). As described above, one or more BWPs only need to be configured to at least one of a plurality of these carriers.

When a plurality of cells are aggregated by CA or DC, a plurality of these cells may include a Primary Cell (PCell) and one or more Secondary Cells (SCells). The PCell may include a PSCell that transmits a PUCCH. The PCell may support a single carrier (CC), and include one or more BWPs. Furthermore, each SCell may support a single carrier (CC), and include one or more BWPs.

Furthermore, each BWP of one or more cells (the P cell and/or the S cells) may be provided with a common search space for a PDCCH (group-common PDCCH) that is common between one or more user terminals.

Furthermore, a specific BWP may be defined in advance for the user terminal. For example, a BWP (initial active BWP) to which a PDSCH for conveying system information (e.g., RMSI: Remaining Minimum System Information) is scheduled may be specified by a frequency position and a bandwidth of a CORESET on which DCI for scheduling the PDSCH is arranged. Furthermore, a numerology identical to the RMSI may be applied to the initial active BWP.

Furthermore, a BWP that is default (default BWP) may be defined for the user terminal. The default BWP may be the above-described initial active BWP or may be configured by a higher layer signaling (e.g., RRC signaling).

By the way, for the future radio communication system (e.g., NR), a Radio Link Monitoring (RLM) method for detecting a Radio Link Failure (RLF) in a case where a plurality of BWPs are configured has been studied.

For example, the UE is not requested to perform RLM measurement outside a range of an activated BWP (active BWP). That is, it is considered that the UE controls an operation so as not to perform RLM measurement on a DL BWP other than activated DL BWPs.

Therefore, a signal used for RLM measurement needs to be configured to be included in a BWP band in a configuration to which a BWP is configured. The signal used for RLM measurement may be referred to as an RLM Reference Signal (RLM-RS).

Furthermore, it has been studied for the future radio communication system to support one or a plurality of RLM-RS resources. The RLM-RS resources may be associated with resources and/or ports for a Synchronization Signal Block (SSB) or a channel state measurement RS (CSI-RS: Channel State Information RS). In addition, the SSB may be referred to as an SS/Physical Broadcast Channel (PBCH) block.

The RLM-RS may be at least one of a Primary Synchronization Signal (PSS: Primary SS), a Secondary Synchronization Signal (SSS: Secondary SS), a Mobility Reference Signal (MRS: Mobility RS), a CSI-RS, a DeModulation Reference Signal (DMRS) and a beam-specific signal, or a signal that is configured by expanding and/or changing these signals (e.g., a signal that is configured by changing a density and/or a periodicity).

The UE may be configured by a higher layer signaling to perform measurement using the RLM-RS resources. The UE configured to perform measurement may be assumed to decide whether a radio link is in an In-Sync (IS) state or an Out-Of-Sync (OOS) state based on a measurement result of the RLM-RS resources. When the base station does not configure the RLM-RS resources, the UE may define default RLM-RS resources for performing RLM in a specification.

In addition, the higher layer signaling may be, for example, a Radio Resource Control (RRC) signaling, a Medium Access Control (MAC) signaling (e.g., an MAC Control Element (MAC CE) or an MAC Protocol Data Unit (PDU)), and broadcast information (a Master Information Block (MIB) or a System Information Block (SIB)).

However, when a plurality of BWPs are configured to the UE as described above, and BWPs to be activated are switched, there is a risk that a BWP band to be configured and a position at which the RLM-RS is arranged cause a problem.

Figure 3:
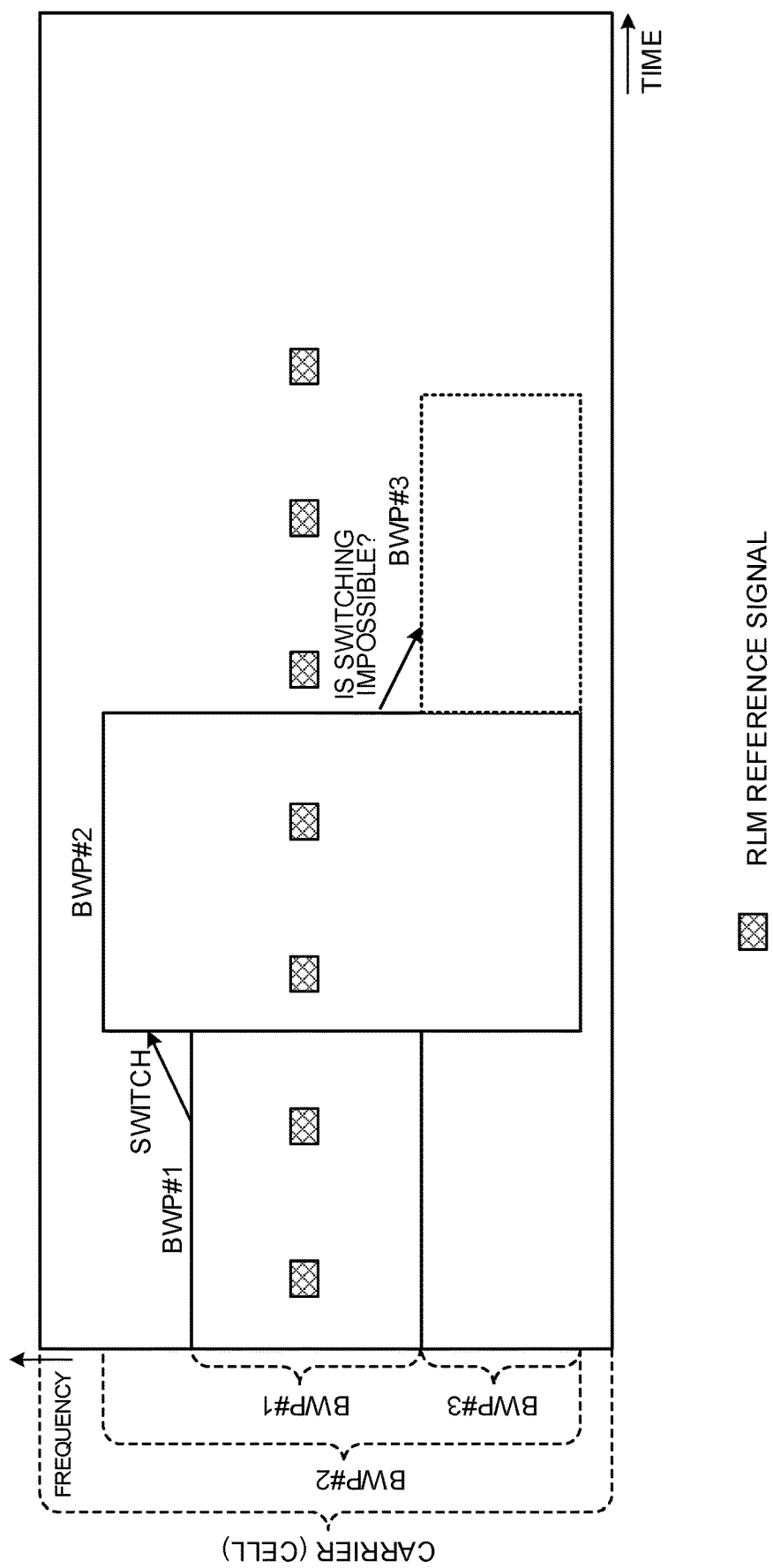
FIG. 3 is a diagram illustrating one example of a case where an RLM reference signal is configured per carrier (carrier unit).

For example, similar to the legacy LTE systems, a case where 1 RLM-RS set is configured to a given cell (e.g., a Primary Cell (PCell) and/or a PSCell) will be assumed. In this regard, the RLM-RS set may include a given number of (e.g., eight) reference signal resources. In this regard, according to a configuration where bandwidths of a plurality of BWPs configured to the UE are different (e.g., do not overlap), the RLM-RSs are configured not to be included in a band of a given BWP (see FIG. 3). FIG. 3 illustrates a case where the RLM-RS is not included in a band of a BWP #3.

It is considered to configure a band of each BWP such that RLM-RSs are included in all of a plurality of BWPs configured to the UE in a case where RLM measurement is performed in each BWP. That is, a plurality of BWPs need to be configured as bands that include all RLM-RSs. In this case, there is a probability that a plurality of BWPs cannot be flexibly configured (there is a restriction on bandwidths of BWPs to be configured). Therefore, there is a risk that a communication throughput and/or communication quality lower.

Alternatively, it is also considered to semi-statically reconfigure the RLM-RSs by a higher layer signaling. However, it is difficult to dynamically control switching of BWPs by DCI in this case. Therefore, there is a risk that a communication throughput and/or communication quality lower.

Hence, the inventors of this application have conceived flexibly configuring a plurality of BWPs by making RLM-RSs configurable in a partial band (BWP) unit instead of making RLM-RSs configurable in a carrier (e.g., PCell and/or a PSCell) unit similar to the legacy LTE system, and preventing a communication throughput and/or communication quality from lowering.

One embodiment of the present invention will be described in detail below with reference to the drawings. In this regard, an example where the BWP #1 to the BWP #3 of different bandwidths are configured in carriers will be described below. The number of BWPs (partial bands), bandwidths and positions configured in the carrier are not limited to these. Furthermore, the following description assumes the PCell and/or the PSCell as carriers. However, the present embodiment is also applicable to the SCell.

Furthermore, the following description will describe an RLM-RS as an example of a DL signal. However, the DL signal to which the present embodiment is applicable is not limited to the RLM-RS, and may be applied to other DL signals (e.g., other DL reference signals) or DL channels. Furthermore, the following description will describe DL as an example. However, the present embodiment may be applied to UL signals and/or UL channels. When, for example, a plurality of BWPs are configured on UL, the present embodiment may be applied to a UL signal (e.g., an SRS or other UL reference signals) to be transmitted in each BWP.

(Configuration of RLM-RS per BWP)

Figure 4:
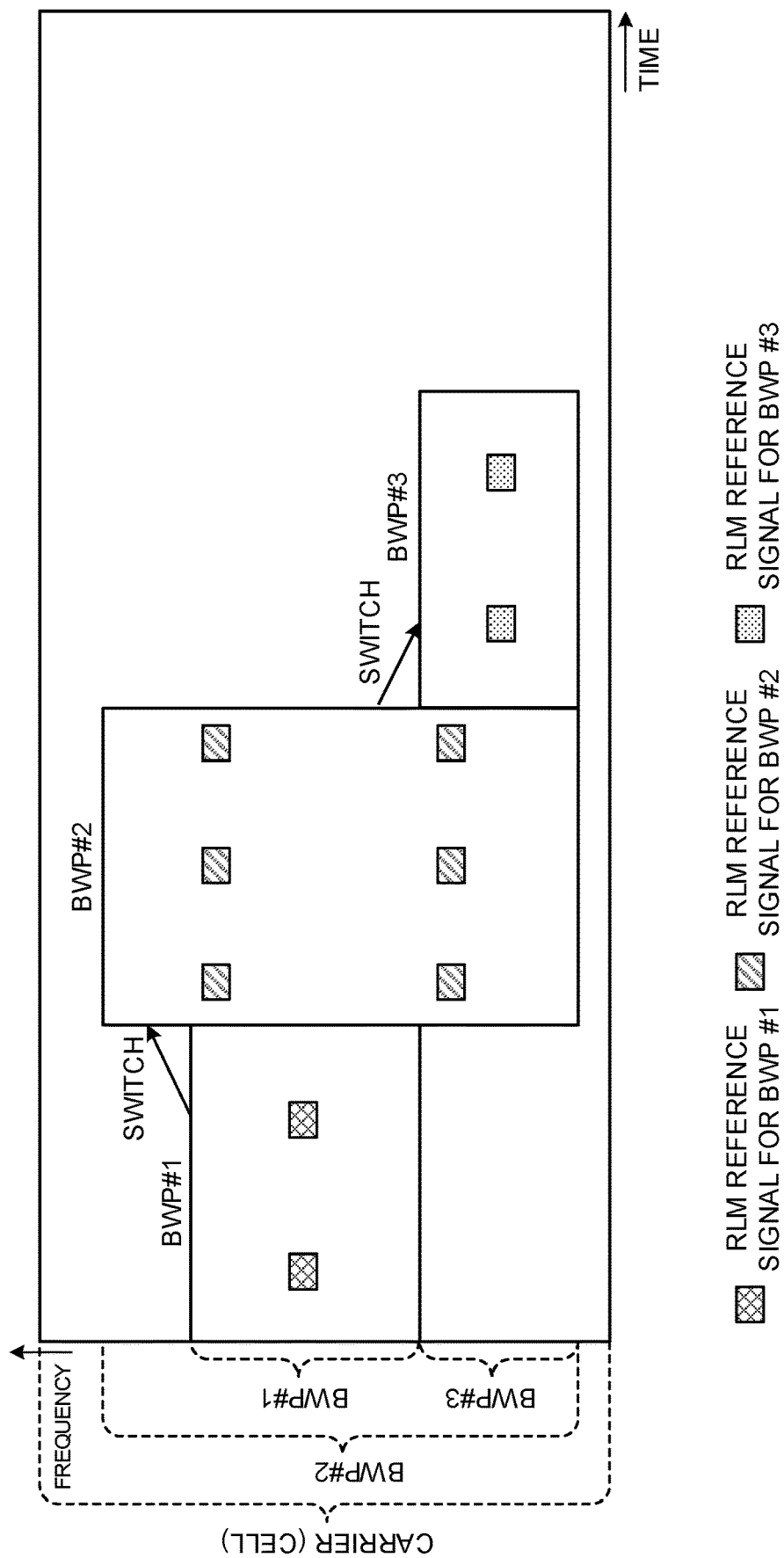
FIG. 4 is a diagram illustrating one example of a case where an RLM reference signal is configured per BWP (BWP unit).

A specific example in a case where an RLM Reference Signal (RLM-RS) is configured per BWP will be described. FIG. 4 illustrates one example of a case where the RLM reference signal is configured per BWP configured in a given carrier (e.g., a PCell and/or a PSCell). In this case, the BWP #1 to the BWP #3 of different bandwidths on DL are configured, and RLM reference signals are respectively configured to the BWP #1 to the BWP #3. In addition, an arrangement of the RLM reference signals illustrated in FIG. 4 is one example, and is not limited to this. For example, an RLM reference signal (or an RLM-RS resource) configured to each BWP may be configured to one frequency position, or may be configured to a plurality of frequency positions.

A given number of (e.g., eight at maximum) resources of the RLM reference signal (RLM-RS resources) configured to each BWP may be configured by using an SSB and/or a CSI-RS. The number of RLM-RS resources configured to each BWP may be the same number, or may be a different number in a given domain.

The given domain may be a domain specified based on a given time domain (e.g., a slot, a subframe or a radio frame) and/or a given frequency domain (e.g., an RB, an RBG or a carrier bandwidth).

FIG. 4 illustrates a case where more RLM-RS resources may be configured to the BWP #2 of a wide bandwidth compared to other BWPs. In this case, FIG. 4 illustrates a case where more RLM-RS resources are configured in the frequency domain and the time domain in the BWP #2 compared to the other BWPs. However, a configuration may be employed where more RLM-RS resources are configured only in one of the frequency domain and the time domain compared to the other BWPs.

By configuring more RLM-RS resources to a BWP of a wide bandwidth compared to the other BWPs, it is possible to appropriately perform RLM measurement according to the bandwidth. In addition, more RLM-RS resources may be configured to the BWP #1 and/or the BWP #3 compared to the BWP #2. Alternatively, an RLM reference signal may be configured to be arranged at one frequency position in each of all BWPs.

Information (also referred to as RLM reference signal configuration information or information related to an RLM reference signal configuration) related to the RLM reference signal configured to each BWP may be notified from the base station to the UE, and may be defined in advance by, for example, a specification. When, for example, configuring a BWP to the UE, the base station uses, for example, a higher layer signaling to notify the UE of the information related to the RLM reference signal associated with the BWP to be configured.

The information related to the RLM reference signal only needs to be information that makes it possible to specify an RLM Reference Signal configuration (RLM-RS configuration), and includes, for example, information related to a resource position of the RLM reference signal.

When an SSB is used as the RLM reference signal, the base station may notify the UE of information (e.g., SSB index) related to an SSB resource per BWP to be configured. When a CSI-RS is used as the RLM reference signal, the base station may notify the UE of information (e.g., a periodicity of the CSI-RS, and/or a measurement bandwidth) related to the CSI-RS resource per BWP to be configured.

The UE controls reception of the RLM reference signal in each BWP (e.g., activated BWP) and/or RLM measurement for each BWP based on the information configured by the base station.

Furthermore, when a BWP to be activated is switched, the UE switches the RLM reference signal associated with the BWP, too, and performs RLM. When, for example, the BWP to be activated is switched from the BWP #1 to the BWP #2 in FIG. 4, the UE switches a reference signal used for RLM, too, similar to the BWP.

In this case, when the UE is instructed to switch the BWP by Downlink Control Information (DCI), the UE switches the BWP to monitor, based on the DCI, and switches monitoring (or RLM measurement) of the RLM reference signal associated with the BWP together.

Thus, by configuring each RLM reference signal associated with each BWP, it is possible to appropriately perform RLM in each BWP even when the BWP is dynamically switched.

In addition, part or entirety of the information (e.g., the information related to resources) related to the RLM reference signal associated with each BWP may be notified to the UE by using, for example, the downlink control information. When, for example, the UE is instructed to switch a BWP by using the downlink control information, the information related to the RLM reference signal that the UE needs to monitor after the switching may be included in the downlink control information.

Alternatively, a plurality of RLM reference signal (e.g., RLM reference signal configuration) candidates may be notified in advance to the UE by, for example, a higher layer signaling, and information that indicates a specific RLM reference signal may be included in the downlink control information and notified to the UE. Consequently, the base station can instruct switching of a BWP by using the downlink control information, and appropriately notify a given RLM reference signal configuration (e.g., a parameter such as a resource) that the UE uses in the switched BWP.

In addition, the RLM reference signal configuration (also referred to as an RLM-RS configuration parameter) configured to each BWP may be configured independently per BWP, and part of the RLM reference signal configuration may be configured in the same way between different BWPs.

A configuration may be employed where, for example, only one RLM reference signal configuration parameter that is common between a plurality of BWPs configured in a carrier is configured only to a given cell (e.g., a PCell and/or a PSCell). The RLM reference signal configuration parameter that is common between a plurality of BWPs include at least one of an RLM reference signal index (e.g., SSB index), an RLM reference signal periodicity (e.g., CSI-RS periodicity), and a measurement bandwidth of the RLM reference signal.

By configuring, for example, the common RLM reference signal periodicity, it is possible to reduce a load of reception processing (or RLM measurement processing) of the UE even when BWPs are frequently switched.

Modified Example

The case where a respectively different RLM reference signal (e.g., RLM reference signal configuration) is applied to each BWP (BWPs #1 to #3 in this case) has been described with reference to FIG. 4. However, the present embodiment is not limited to this. The same RLM reference signal may be used for part of BWPs (e.g., 2 or more BWPs whose part of bandwidths to be configured overlap) among a plurality of BWPs configured to a UE.

Figure 5:
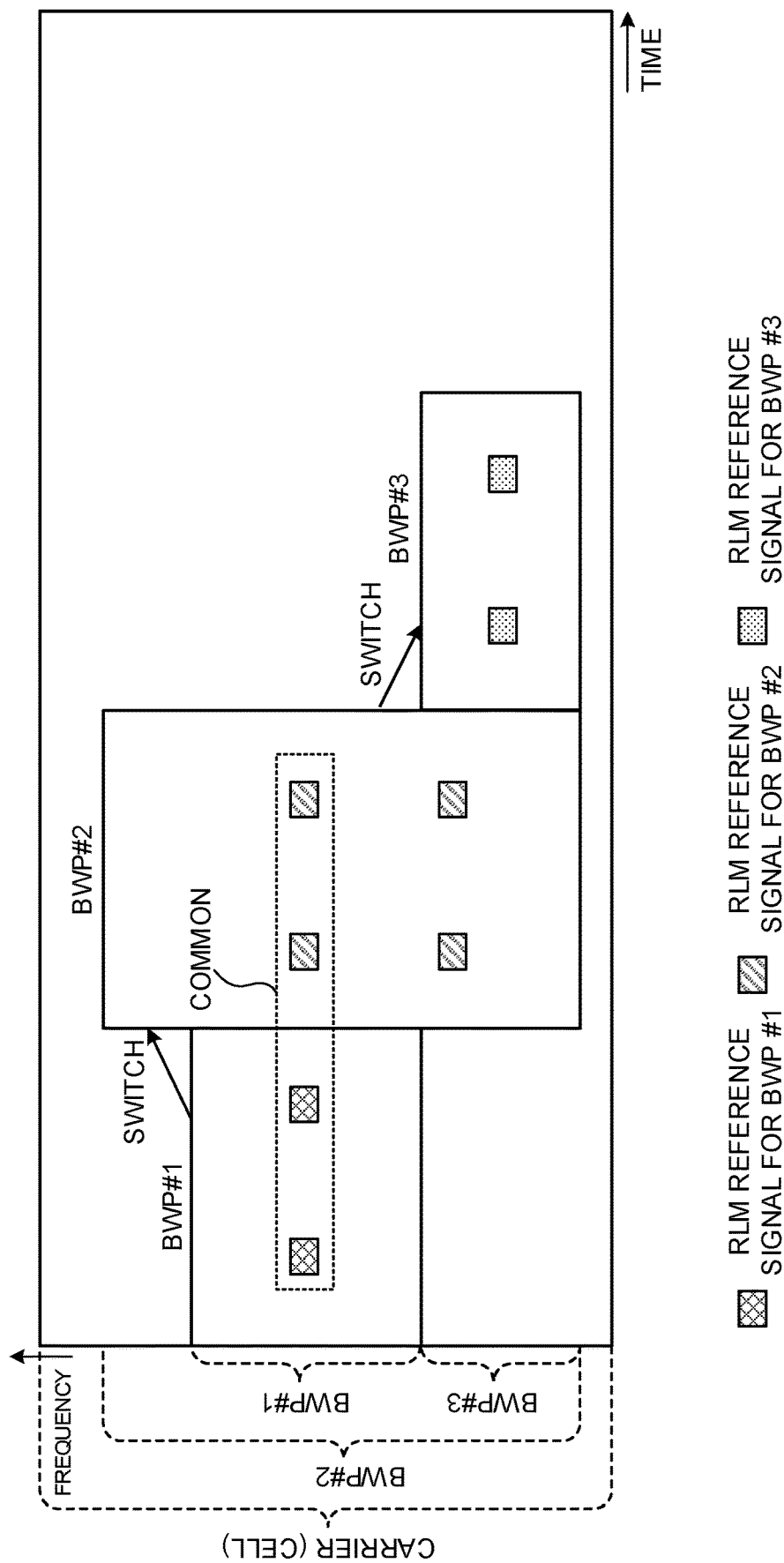
FIG. 5 is a diagram illustrating another example of a case where an RLM reference signal is configured per BWP (BWP unit).

For example, the same RLM reference signal may be configured to two BWPs whose at least part of bandwidths overlap (see FIG. 5). FIG. 5 illustrates a case where at least a common RLM reference signal is configured to the BWP #1 and the BWP #2. Thus, by configuring the same RLM reference signal to BWPs whose bandwidths overlap, it is possible to reduce a load of reception processing of the UE.

Furthermore, when the common RLM reference signal is configured to the BWP #1 and the BWP #2, reference signals that are not common between the BWPs may be additionally configured. As illustrated in, for example, FIG. 5, an RLM reference signal that is common to the BWP #1 may be configured to a frequency band in the BWP #2 that overlaps that of the BWP #1, and an RLM reference signal may be additionally configured to the frequency domain that does not overlap the BWP #1. That is, part of the RLM reference signal configured to the BWP #2 is used as the RLM reference signal for the BWP #1.

In this case, a base station may separately configure respective RLM reference signals to the BWP #1 and the BWP #2 for the UE. Alternatively, the base station may configure a plurality of RLM reference signals (e.g., an RLM reference signal configured for the BWP #2) to the UE, and the UE may autonomously select an RLM reference signal associated with a BWP (or a bandwidth of the BWP) to be activated, based on the BWP. In this case, it is possible to notify information of an RLM reference signal that is commonly used between a plurality of BWPs together, so that it is possible to reduce a signaling amount.

In addition, the number of BWPs to which the common RLM reference signal is configured may be 2 or more. Furthermore, a common RLM reference signal may be configured to the BWP #2 and the BWP #1, and a common RLM reference signal may be configured to the BWP #2 and the BWP #3.

Furthermore, a configuration may be employed where a plurality of RLM reference signal candidates are configured (notified) in advance to the UE in a carrier (e.g., over a carrier bandwidth), and the UE side selects an RLM reference signal included in a bandwidth of a BWP to be activated. Alternatively, a plurality of RLM reference signal candidates may be configured (or notified) in advance to the UE in the carrier (e.g., over the carrier bandwidth), and a given RLM reference signal may be indicated by using downlink control information. The Downlink Control Information (DCI) may be DCI for notifying a BWP to be activated.

Furthermore, the base station may notify information (e.g., RLM-RS configuration) related to an RLM reference signal that is common to each BWP by a signaling per cell (a carrier or a CC) similar to a serving cell configuration (Servingcellconfig). In this case, the base station may signal a part that differs per BWP to the UE by using information (e.g., BWP configuration) related to the BWP. Information that differs per BWP is, for example, a frequency position of an RLM-RS. The UE decides the RLM reference signal in each BWP based on information (e.g., information that is common to each BWP) signaled per cell, and information (the information that differs per BWP) included in the BWP configuration.

(Radio Communication System)

The configuration of the radio communication system according to one embodiment of the present invention will be described below. This radio communication system uses one or a combination of the radio communication method according to each of the above embodiment of the present invention to perform communication.

Figure 6:
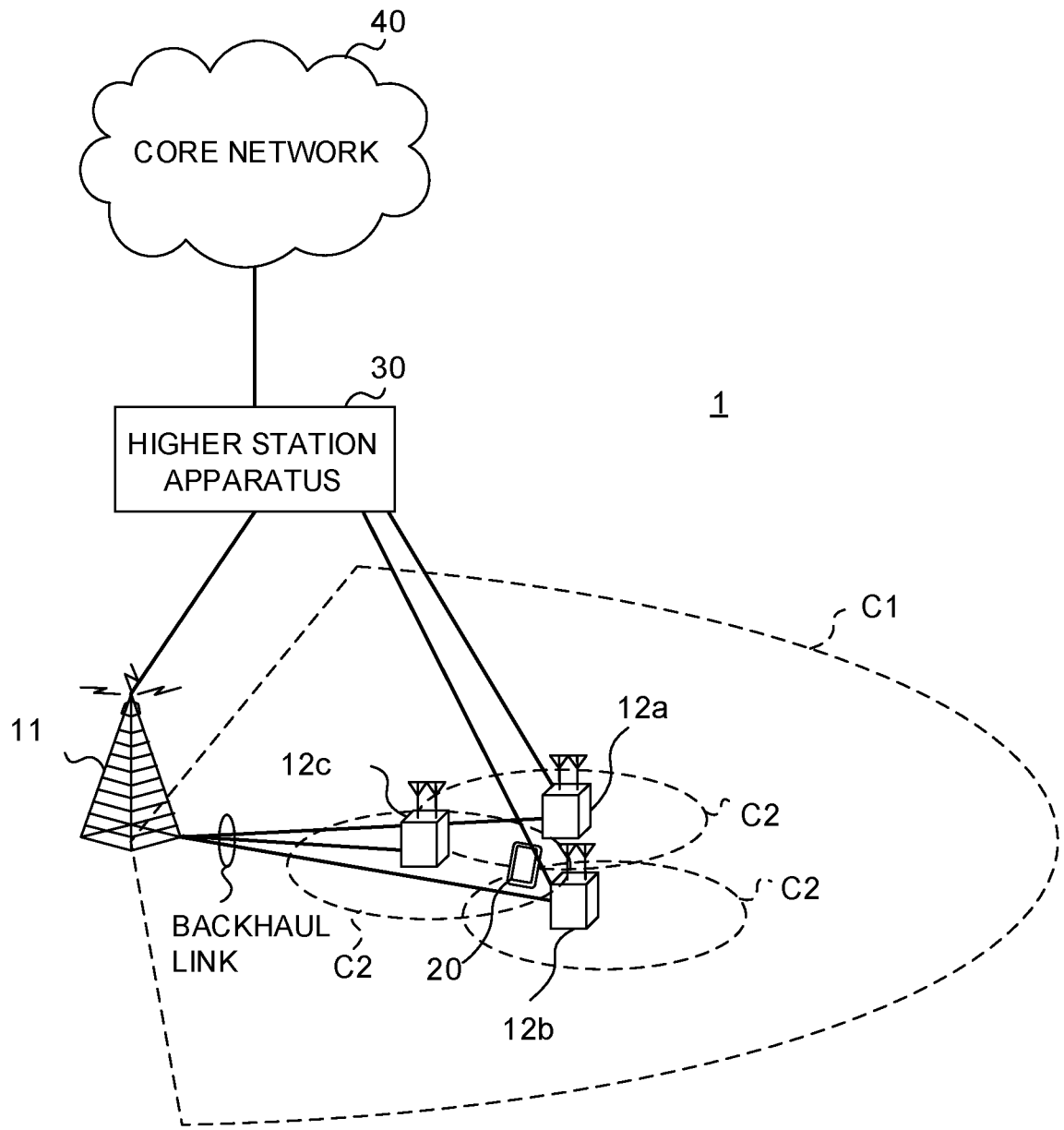
FIG. 6 is a diagram illustrating one example of a schematic configuration of a radio communication system according to the present embodiment.

FIG. 6 is a diagram illustrating one example of a schematic configuration of the radio communication system according to the one embodiment of the present invention. A radio communication system 1 can apply Carrier Aggregation (CA) and/or Dual Connectivity (DC) that aggregate a plurality of base frequency blocks (component carriers) whose 1 unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), New Radio (NR), Future Radio Access (FRA) and the New Radio Access Technology (New-RAT), or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2. An arrangement and the numbers of respective cells and the user terminals 20 are not limited to those illustrated in FIG. 6.

The user terminal 20 can connect with both of the radio base station 11 and the radio base stations 12. The user terminal 20 is assumed to concurrently use the macro cell C1 and the small cells C2 by CA or DC. Furthermore, the user terminal 20 can apply CA or DC by using a plurality of cells (CCs) (e.g., five CCs or less or six CCs or more).

The user terminal 20 and the radio base station 11 can communicate by using a carrier (also referred to as a legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz or 5 GHz) or may use the same carrier as that used between the user terminal 20 and the radio base station 11. In this regard, a configuration of the frequency band used by each radio base station is not limited to this.

The radio base station 11 and each radio base station 12 (or the two radio base stations 12) may be configured to be connected by way of wired connection (e.g., optical fibers compliant with a Common Public Radio Interface (CPRI) or an X2 interface) or radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and applies Single Carrier-Frequency Division Multiple Access (SC-FDMA) and/or OFDMA to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into bands including one or contiguous resource blocks per terminal and causes a plurality of terminals to use respectively different bands to reduce an inter-terminal interference. In this regard, uplink and downlink radio access schemes are not limited to a combination of these schemes, and other radio access schemes may be used.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and System Information Blocks (SIBs) are conveyed on the PDSCH. Furthermore, Master Information Blocks (MIBs) are conveyed on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and/or the PUSCH is conveyed on the PDCCH.

In addition, the scheduling information may be notified by the DCI. For example, DCI for scheduling DL data reception may be referred to as a DL assignment, and DCI for scheduling UL data transmission may be referred to as a UL grant.

The number of OFDM symbols used for the PDCCH is conveyed on the PCFICH. Transmission acknowledgement information (also referred to as, for example, retransmission control information, HARQ-ACK or ACK/NACK) of a Hybrid Automatic Repeat reQuest (HARQ) for the PUSCH is conveyed on the PHICH. The EPDCCH is subjected to frequency division multiplexing with the PDSCH (downlink shared data channel) and is used to convey DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are conveyed on the PUSCH. Furthermore, downlink radio quality information (CQI: Channel Quality Indicator), transmission acknowledgement information and a Scheduling Request (SR) are conveyed on the PUCCH. A random access preamble for establishing connection with a cell is conveyed on the PRACH.

The radio communication system 1 conveys a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 conveys a Sounding Reference Signal (SRS) and a DeModulation Reference Signal (DMRS) as uplink reference signals. In this regard, the DMRS may be referred to as a user terminal-specific reference signal (UE-specific Reference Signal). Furthermore, a reference signal to be conveyed is not limited to these.

<Radio Base Station>

Figure 7:
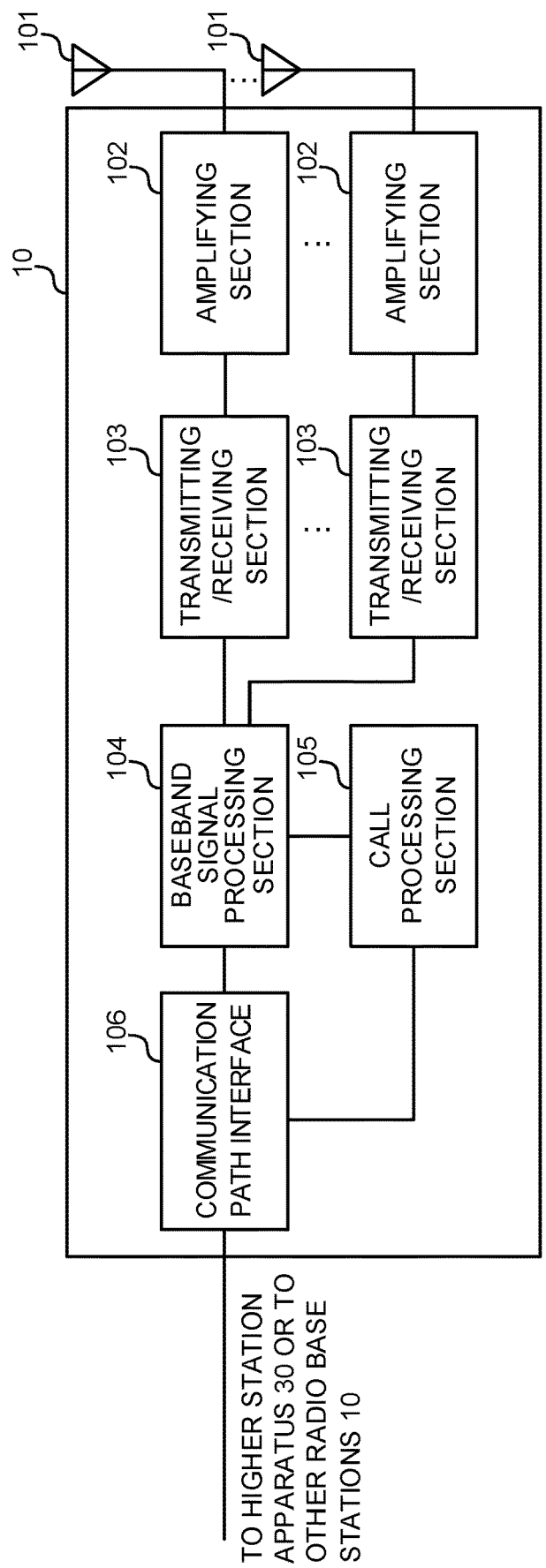
FIG. 7 is a diagram illustrating one example of an overall configuration of a radio base station according to the present embodiment.

FIG. 7 is a diagram illustrating one example of an overall configuration of the radio base station according to the one embodiment of the present invention. The radio base station 10 includes pluralities of transmission/reception antennas 101, amplifying sections 102 and transmitting/receiving sections 103, a baseband signal processing section 104, a call processing section 105 and a channel interface 106. In this regard, the radio base station 10 only needs to be configured to include one or more of each of the transmission/reception antennas 101, the amplifying sections 102 and the transmitting/receiving sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmitting/receiving section 103. Furthermore, the baseband signal processing section 104 performs transmission processing such as channel coding and inverse fast Fourier transform on a downlink control signal, too, and transfers the downlink control signal to each transmitting/receiving section 103.

Each transmitting/receiving section 103 converts a baseband signal precoded and output per antenna from the baseband signal processing section 104 into a radio frequency range, and transmits a radio frequency signal. The radio frequency signal subjected to frequency conversion by each transmitting/receiving section 103 is amplified by each amplifying section 102, and is transmitted from each transmission/reception antenna 101. The transmitting/receiving sections 103 can be composed of transmitters/receivers, transmission/reception circuits or transmission/reception apparatuses described based on a common knowledge in a technical field according to the present invention. In this regard, the transmitting/receiving sections 103 may be composed as an integrated transmitting/receiving section or may be composed of transmitting sections and receiving sections.

Meanwhile, each amplifying section 102 amplifies a radio frequency signal received by each transmission/reception antenna 101 as an uplink signal. Each transmitting/receiving section 103 receives the uplink signal amplified by each amplifying section 102. Each transmitting/receiving section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, MAC retransmission control reception processing, and reception processing of an RLC layer and a PDCP layer on user data included in the input uplink signal, and transfers the user data to the higher station apparatus 30 via the channel interface 106. The call processing section 105 performs call processing (such as configuration and release) of a communication channel, state management of the radio base station 10, and radio resource management.

The channel interface 106 transmits and receives signals to and from the higher station apparatus 30 via a given interface. Furthermore, the channel interface 106 may transmit and receive (backhaul signaling) signals to and from the another radio base station 10 via an inter-base station interface (e.g., optical fibers compliant with the Common Public Radio Interface (CPRI) or the X2 interface).

Furthermore, each transmitting/receiving section 103 transmits a DL signal (e.g., RLM reference signal) configured per BWP. Each transmitting/receiving section 103 transmits information related to a BWP to be configured, and/or information related to the RLM reference signal associated with the BWP to be configured. Each transmitting/receiving section 103 may transmit information that indicates BWPs to be activated, by Downlink Control Information (DCI).

Figure 8:
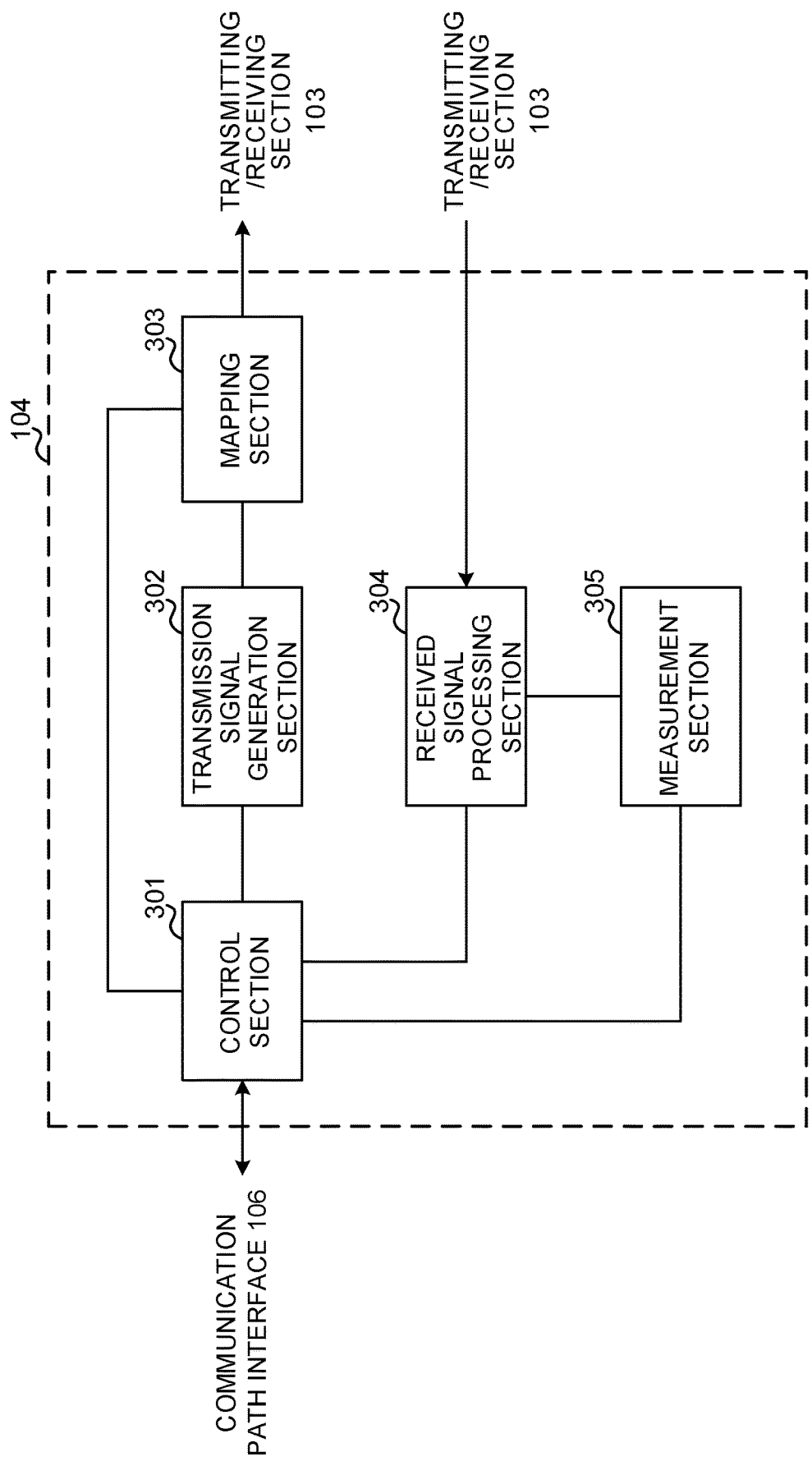
FIG. 8 is a diagram illustrating one example of a function configuration of the radio base station according to the present embodiment.

FIG. 8 is a diagram illustrating one example of a function configuration of the radio base station according to the one embodiment of the present invention. In addition, this example mainly illustrates function blocks of characteristic portions according to the present embodiment, and assumes that the radio base station 10 includes other function blocks, too, that are necessary for radio communication.

The baseband signal processing section 104 includes at least a control section (scheduler) 301, a transmission signal generating section 302, a mapping section 303, a received signal processing section 304 and a measurement section 305. In addition, these components only need to be included in the radio base station 10, and part or all of the components may not be included in the baseband signal processing section 104.

The control section (scheduler) 301 controls the entire radio base station 10. The control section 301 can be composed of a controller, a control circuit or a control apparatus described based on the common knowledge in the technical field according to the present invention.

The control section 301 controls, for example, signal generation of the transmission signal generating section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal that is transmitted on the PDSCH), and a downlink control signal (e.g., a signal that is transmitted on the PDCCH and/or the EPDCCH and is, for example, transmission acknowledgement information). Furthermore, the control section 301 controls generation of a downlink control signal and a downlink data signal based on a result obtained by deciding whether or not it is necessary to perform retransmission control on an uplink data signal. Furthermore, the control section 301 controls scheduling of synchronization signals (e.g., a Primary Synchronization Signal (PSS)/a Secondary Synchronization Signal (SSS)) and downlink reference signals (e.g., a CRS, a CSI-RS and a DMRS).

The control section 301 controls scheduling of an uplink data signal (e.g., a signal that is transmitted on the PUSCH), an uplink control signal (e.g., a signal that is transmitted on the PUCCH and/or the PUSCH and is, for example, transmission acknowledgement information), a random access preamble (e.g., a signal that is transmitted on the PRACH) and an uplink reference signal.

Furthermore, the control section 301 controls transmission of the RLM reference signal configured per BWP. The control section 301 may configure a common RLM reference signal to two BWPs whose at least part of bands overlap among a plurality of BWPs. Furthermore, the control section 301 may configure to the same value at least one of parameters (e.g., an SS block index, a CRI-RS periodicity and a measurement bandwidth) that is common between RLM reference signals configured per plural BWPs.

The transmission signal generating section 302 generates a downlink signal (such as a downlink control signal, a downlink data signal or a downlink reference signal) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present invention.

The transmission signal generating section 302 generates, for example, a DL assignment for notifying downlink data allocation information, and/or a UL grant for notifying uplink data allocation information based on the instruction from the control section 301. The DL assignment and the UL grant are both DCI, and conform to a DCI format. Furthermore, the transmission signal generating section 302 performs encoding processing and modulation processing on a downlink data signal according to a code rate and a modulation scheme determined based on Channel State Information (CSI) from each user terminal 20.

The mapping section 303 maps the downlink signal generated by the transmission signal generating section 302, on given radio resources based on the instruction from the control section 301, and outputs the downlink signal to each transmitting/receiving section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a received signal input from each transmitting/receiving section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present invention.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present invention.

For example, the measurement section 305 may perform Radio Resource Management (RRM) measurement or Channel State Information (CSI) measurement based on the received signal. The measurement section 305 may measure received power (e.g., Reference Signal Received Power (RSRP)), received quality (e.g., Reference Signal Received Quality (RSRQ) or a Signal to Interference plus Noise Ratio (SINR)), a signal strength (e.g., a Received Signal Strength Indicator (RSSI)) or channel information (e.g., CSI). The measurement section 305 may output a measurement result to the control section 301.

<User Terminal>

Figure 9:
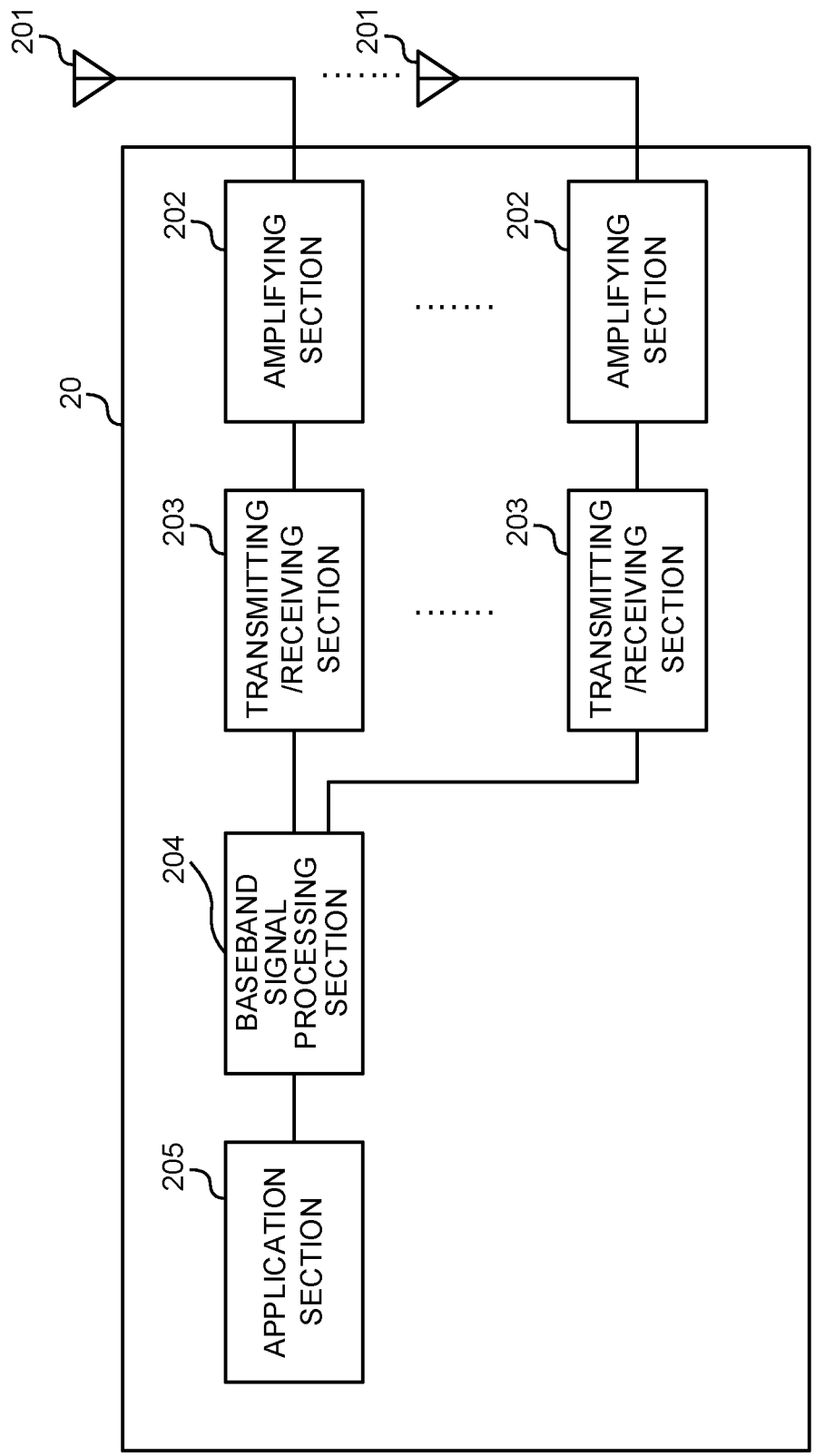
FIG. 9 is a diagram illustrating one example of an overall configuration of a user terminal according to the present embodiment.

FIG. 9 is a diagram illustrating one example of an overall configuration of the user terminal according to the one embodiment of the present invention. The user terminal 20 includes pluralities of transmission/reception antennas 201, amplifying sections 202 and transmitting/receiving sections 203, a baseband signal processing section 204 and an application section 205. In this regard, the user terminal 20 only needs to be configured to include one or more of each of the transmission/reception antennas 201, the amplifying sections 202 and the transmitting/receiving sections 203.

Each amplifying section 202 amplifies a radio frequency signal received at each transmission/reception antenna 201. Each transmitting/receiving section 203 receives a downlink signal amplified by each amplifying section 202. Each transmitting/receiving section 203 performs frequency conversion on the received signal into a baseband signal, and outputs the baseband signal to the baseband signal processing section 204. The transmitting/receiving sections 203 can be composed of transmitters/receivers, transmission/reception circuits or transmission/reception apparatuses described based on the common knowledge in the technical field according to the present invention. In this regard, the transmitting/receiving sections 203 may be composed as an integrated transmitting/receiving section or may be composed of transmitting sections and receiving sections.

The baseband signal processing section 204 performs FFT processing, error correcting decoding, and retransmission control reception processing on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information of the downlink data, too, to the application section 205.

On the other hand, the application section 205 inputs uplink user data to the baseband signal processing section 204. The baseband signal processing section 204 performs retransmission control transmission processing (e.g., HARQ transmission processing), channel coding, precoding, Discrete Fourier Transform (DFT) processing and IFFT processing on the uplink user data, and transfers the uplink user data to each transmitting/receiving section 203. Each transmitting/receiving section 203 converts the baseband signal output from the baseband signal processing section 204 into a radio frequency range, and transmits a radio frequency signal. The radio frequency signal subjected to the frequency conversion by each transmitting/receiving section 203 is amplified by each amplifying section 202, and is transmitted from each transmission/reception antenna 201.

Furthermore, each transmitting/receiving section 203 transmits a DL signal (e.g., RLM reference signal) in one of a plurality of BWPs that are configurable in a carrier. Each transmitting/receiving section 203 receives information related to a BWP to be configured, and/or information related to the RLM reference signal associated with the BWP to be configured. Each transmitting/receiving section 203 may transmit information that indicates BWPs to be activated, by Downlink Control Information (DCI).

Figure 10:
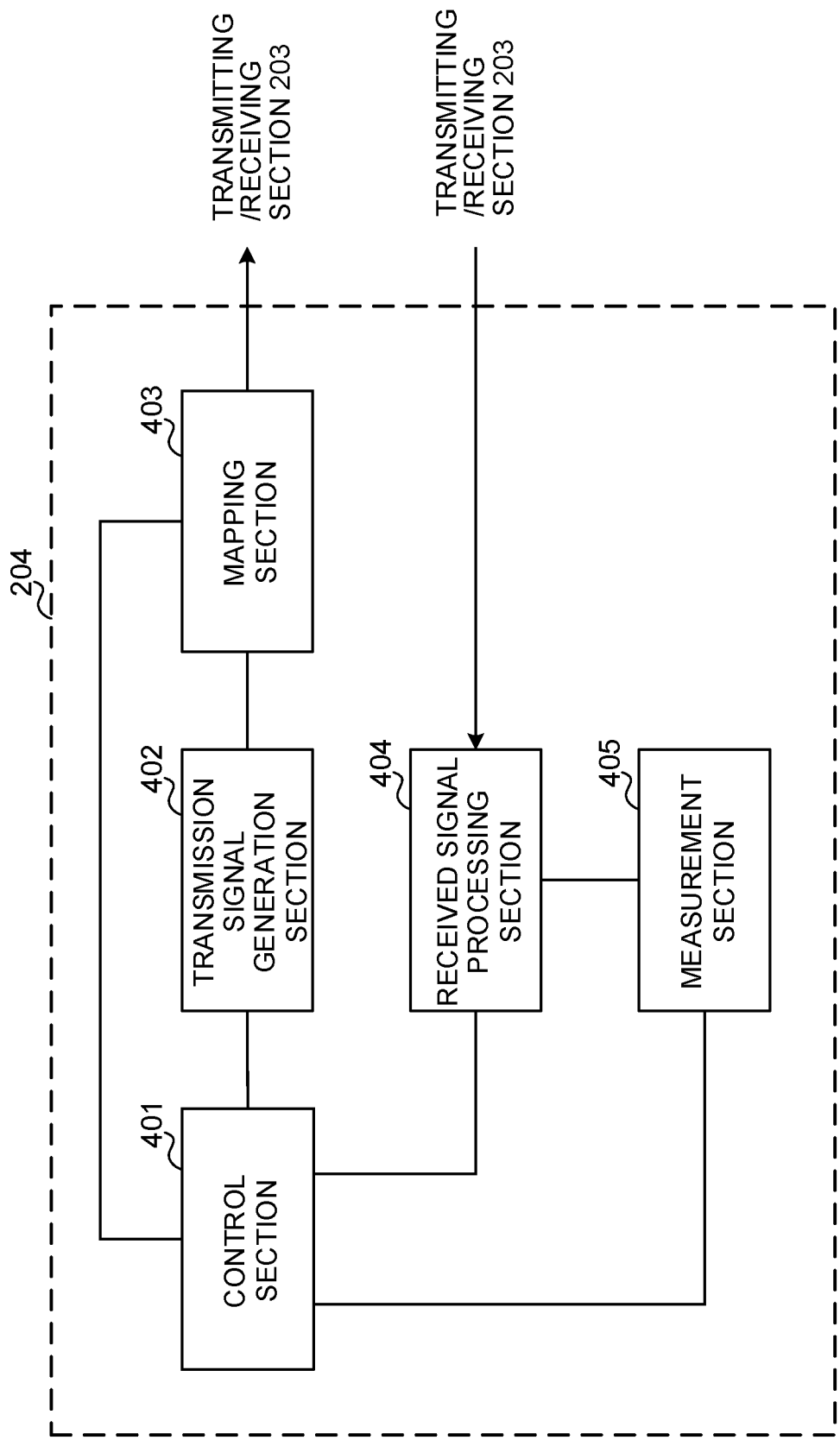
FIG. 10 is a diagram illustrating one example of a function configuration of the user terminal according to the present embodiment.

FIG. 10 is a diagram illustrating one example of a function configuration of the user terminal according to the one embodiment of the present invention. In addition, this example mainly illustrates function blocks of characteristic portions according to the present embodiment, and assumes that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present invention.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 obtains from the received signal processing section 404 a downlink control signal and a downlink data signal transmitted from the radio base station 10. The control section 401 controls generation of an uplink control signal and/or an uplink data signal based on a result obtained by deciding whether or not it is necessary to perform retransmission control on the downlink control signal and/or the downlink data signal.

Furthermore, the control section 401 controls reception of the RLM reference signal (RLM measurement that uses the RLM reference signal) configured per plural BWPs. Furthermore, when a given BWP is activated (when, for example, activation of the given BWP is notified by the downlink control information), the control section 401 controls selection of the RLM reference signal to receive.

Furthermore, the control section 401 may perform control to receive an RLM reference signal that is commonly configured to two BWPs whose at least part of bands overlap among a plurality of BWPs. Furthermore, the control section 401 may control reception processing (or RLM measurement) assuming that at least one of the parameters that are common between RLM reference signals configured per plural BWPs is configured to the same value.

The transmission signal generating section 402 generates an uplink signal (such as an uplink control signal, an uplink data signal or an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present invention.

The transmission signal generating section 402 generates an uplink control signal related to transmission acknowledgement information and Channel State Information (CSI) based on, for example, the instruction from the control section 401. Furthermore, the transmission signal generating section 402 generates an uplink data signal based on the instruction from the control section 401. When, for example, the downlink control signal notified from the radio base station 10 includes a UL grant, the transmission signal generating section 402 is instructed by the control section 401 to generate an uplink data signal.

The mapping section 403 maps the uplink signal generated by the transmission signal generating section 402, on radio resources based on the instruction from the control section 401, and outputs the uplink signal to each transmitting/receiving section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the received signal input from each transmitting/receiving section 203. In this regard, the received signal is, for example, a downlink signal (such as a downlink control signal, a downlink data signal or a downlink reference signal) transmitted from the radio base station 10. The received signal processing section 404 can be composed of a signal processor, a signal processing circuit or a signal processing apparatus described based on the common knowledge in the technical field according to the present invention. Furthermore, the received signal processing section 404 can compose the receiving section according to the present invention.

The received signal processing section 404 outputs information decoded by the reception processing to the control section 401. The received signal processing section 404 outputs, for example, broadcast information, system information, an RRC signaling and DCI to the control section 401. Furthermore, the received signal processing section 404 outputs the received signal and/or the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present invention.

For example, the measurement section 405 may perform RRM measurement or CSI measurement based on the received signal. The measurement section 405 may measure received power (e.g., RSRP), received quality (e.g., RSRQ or an SINR), a signal strength (e.g., RSSI) or channel information (e.g., CSI). The measurement section 405 may output a measurement result to the control section 401.

<Hardware Configuration>

In addition, the block diagrams used to describe the above embodiment illustrate blocks in function units. These function blocks (components) are realized by an optional combination of hardware and/or software. Furthermore, a method for realizing each function block is not limited in particular. That is, each function block may be realized by using one physically and/or logically coupled apparatus or may be realized by using a plurality of these apparatuses formed by connecting two or more physically and/or logically separate apparatuses directly and/or indirectly (by using, for example, wired connection and/or radio connection).

Figure 11:
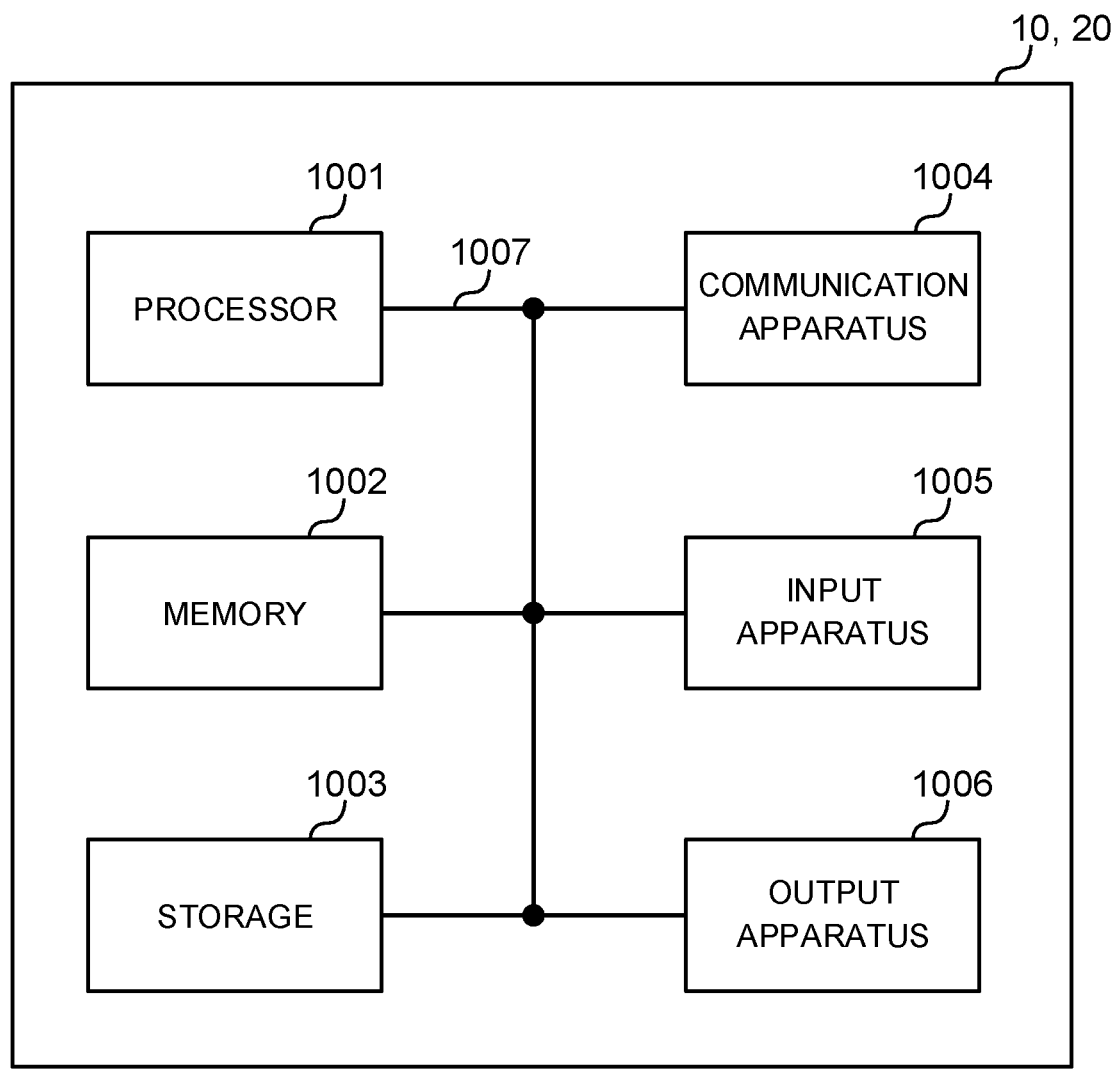
FIG. 11 is a diagram illustrating one example of hardware configurations of the radio base station and the user terminal according to the present embodiment.

For example, the radio base station and the user terminal according to the one embodiment of the present invention may function as computers that perform processing of the radio communication method according to the present invention. FIG. 11 is a diagram illustrating one example of the hardware configurations of the radio base station and the user terminal according to the one embodiment of the present invention. The above-described radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 11 or may be configured without including part of the apparatuses.

For example, FIG. 11 illustrates the only one processor 1001. However, there may be a plurality of processors. Furthermore, processing may be executed by 1 processor or processing may be executed by 1 or more processors concurrently or successively or by using another method. In addition, the processor 1001 may be implemented by 1 or more chips.

Each function of the radio base station 10 and the user terminal 20 is realized by, for example, causing hardware such as the processor 1001 and the memory 1002 to read given software (program), and thereby causing the processor 1001 to perform an operation, and control communication via the communication apparatus 1004 and control reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above-described baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above-described embodiment are used. For example, the control section 401 of the user terminal 20 may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to perform the radio communication method according to the one embodiment of the present invention.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via wired and/or radio networks, and will be also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above-described transmission/reception antennas 101 (201), amplifying sections 102 (202), transmitting/receiving sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using different buses between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

Modified Example

In addition, each term that has been described in this description and/or each term that is necessary to understand this description may be replaced with terms having identical or similar meanings. For example, a channel and/or a symbol may be signals (signalings). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time-domain. Each of one or a plurality of durations (frames) that composes a radio frame may be referred to as a subframe. Furthermore, the subframe may include one or a plurality of slots in the time-domain. The subframe may be a fixed time duration (e.g., 1 ms) that does not depend on the numerologies.

Furthermore, the slot may include one or a plurality of symbols (Orthogonal Frequency Division Multiplexing (OFDM) symbols or Single Carrier-Frequency Division Multiple Access (SC-FDMA) symbols) in the time-domain. Furthermore, the slot may be a time unit based on the numerologies. Furthermore, the slot may include a plurality of mini slots. Each mini slot may include one or a plurality of symbols in the time-domain. Furthermore, the mini slot may be referred to as a subslot.

The radio frame, the subframe, the slot, the mini slot and the symbol each indicate a time unit for conveying signals. The other corresponding names may be used for the radio frame, the subframe, the slot, the mini slot and the symbol. For example, 1 subframe may be referred to as a Transmission Time Interval (TTI), a plurality of contiguous subframes may be referred to as TTIs, or 1 slot or 1 mini slot may be referred to as a TTI. That is, the subframe and/or the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block and/or codeword, or may be a processing unit of scheduling or link adaptation. In addition, when the TTI is given, a time period (e.g., the number of symbols) in which a transport block, a code block and/or a codeword are actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

Resource Blocks (RBs) are resource allocation units of the time-domain and the frequency-domain, and may include one or a plurality of contiguous subcarriers in the frequency-domain. Furthermore, the RB may include one or a plurality of symbols in the time-domain or may have the length of 1 slot, 1 mini slot, 1 subframe or 1 TTI. 1 TTI or 1 subframe may each include one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by using absolute values, may be expressed by using relative values with respect to given values or may be expressed by using other corresponding information. For example, a radio resource may be instructed by a given index.

Names used for parameters in this description are in no respect restrictive names. For example, various channels (the Physical Uplink Control Channel (PUCCH) and the Physical Downlink Control Channel (PDCCH)) and information elements can be identified based on various suitable names Therefore, various names assigned to these various channels and information elements are in no respect restrictive names.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The information and signals to be input and output can be overwritten, updated or additionally written. The output information and signals may be deleted. The input information and signals may be transmitted to other apparatuses.

Notification of information is not limited to the aspect/embodiment described in this description and may be performed by using other methods. For example, the information may be notified by a physical layer signaling (e.g., Downlink Control Information (DCI) and Uplink Control Information (UCI)), a higher layer signaling (e.g., a Radio Resource Control (RRC) signaling, broadcast information (Master Information Blocks (MIBs) and System Information Blocks (SIBs)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be performed implicitly (by, for example, not notifying this given information or by notifying another information).

Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or is referred to as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSLs)) and/or radio techniques (e.g., infrared rays and microwaves), these wired techniques and/or radio techniques are included in a definition of the transmission media.

The terms "system" and "network" used in this description are compatibly used.

In this description, the terms "Base Station (BS)", "radio base station", "eNB", "gNB", "cell", "sector", "cell group", "carrier" and "component carrier" can be compatibly used. The base station will be also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can also provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used. The base station will be also referred to as a term such as a fixed station, a NodeB, an eNodeB (eNB), an access point, a transmission point, a reception point, a femtocell or a small cell in some cases.

The mobile station will be also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above-described radio base station 10. Furthermore, words such as "uplink" and "downlink" may be read as a "side". For example, the uplink channel may be read as a side channel.

Similarly, the user terminal in this description may be read as the radio base station. In this case, the radio base station 10 may be configured to include the functions of the above-described user terminal 20.

In this description, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MMEs) or Serving-Gateways (S-GWs) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideB and (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between 2 or more elements, and can include that 1 or more intermediate elements exist between the two elements "connected" or "coupled" with each other. The elements may be coupled or connected physically or logically or by a combination of the physical and logical connections. For example, "connection" may be read as "access".

It can be understood in this description that, when connected, the two elements are "connected" or "coupled" with each other by using 1 or more electric wires, cables and/or printed electrical connection, and by using electromagnetic energy having wavelengths in radio frequency domains, microwave domains and/or (both of visible and invisible) light domains in some non-restrictive and non-comprehensive examples.

A sentence that "A and B are different" in this description may mean that "A and B are different from each other". Words such as "separate" and "coupled" may be also interpreted in a similar manner.

When the words "including" and "comprising" and modifications of these words are used in this description or the claims, these words intend to be comprehensive similar to the word "having". Furthermore, the word "or" used in this description or the claims intends not to be an exclusive OR.

The present invention has been described in detail above. However, it is obvious for a person skilled in the art that the present invention is not limited to the embodiment described in this description. The present invention can be carried out as modified and changed aspects without departing from the gist and the scope of the present invention defined based on the recitation of the claims. Accordingly, the disclosure of this description is intended for exemplary explanation, and does not bring any restrictive meaning to the present invention.

The invention claimed is:

1. A terminal comprising:
a receiver that receives configuration information including an index of a reference signal comprising a synchronization signal block (SSB) for each bandwidth part (BWP) relating to radio link monitoring in a carrier, and receives information regarding a transmission periodicity of the reference signal, the transmission periodicity being common to a first BWP and a second BWP in the carrier; and
a processor that controls reception of the reference signal for the radio link monitoring based on the configuration information and the information regarding the transmission periodicity of the reference signal,
wherein the configuration information for the first BWP is different from the configuration information for the second BWP, and
a maximum number of resources of the references signal for each BWP in a given time domain is eight.

2. The terminal according to claim 1, wherein a resource of the reference signal is configured by using the SSB.

3. The terminal according to claim 1, wherein the processor performs the radio link monitoring using the reference signal corresponding to an active BWP.

4. A radio communication method for a terminal, comprising:
receiving configuration information including an index of a reference signal comprising a synchronization signal block (SSB) for each bandwidth part (BWP) relating to radio link monitoring in a carrier, and
receiving information regarding a transmission periodicity of the reference signal, the transmission periodicity being common to a first BWP and a second BWP in the carrier; and
controlling reception of the reference signal for the radio link monitoring based on the configuration information and the information regarding the transmission periodicity of the reference signal,
wherein the configuration information for the first BWP is different from the configuration information for the second BWP, and
a maximum number of resources of the references signal for each BWP in a given time domain is eight.

5. A base station comprising:
a transmitter that transmits configuration information including an index of a reference signal comprising a synchronization signal block (SSB) for each bandwidth part (BWP) relating to radio link monitoring in a carrier, and transmits information regarding a transmission periodicity of the reference signal, the transmission periodicity being common to a first BWP and a second BWP in the carrier; and
a processor that controls transmission of the reference signal for the radio link monitoring based on the configuration information and the information regarding the transmission periodicity of the reference signal,
wherein the configuration information for the first BWP is different from the configuration information for the second BWP, and
a maximum number of resources of the references signal for each BWP in a given time domain is eight.

6. The terminal according to claim 2, wherein the processor performs the radio link monitoring using the reference signal corresponding to an active BWP.

7. The terminal according to claim 1, wherein the processor controls reception of the reference signal in an initial active BWP for the radio link monitoring.

8. A system comprising a terminal and a base station, wherein:
the terminal comprises:
a receiver that receives configuration information including an index of a reference signal comprising a synchronization signal block (SSB) for each bandwidth part (BWP) relating to radio link monitoring in a carrier, and receives information regarding a transmission periodicity of the reference signal, the transmission periodicity being common to a first BWP and a second BWP in the carrier; and
a processor that controls reception of the reference signal for the radio link monitoring based on the configuration information and the information regarding the transmission periodicity of the reference signal,
wherein the configuration information for the first BWP is different from the configuration information for the second BWP, and a maximum number of resources of the references signal for each BWP in a given time domain is eight, and the base station comprises:
- a transmitter that transmits the configuration information including the index of the reference signal comprising the SSB for each BWP relating to radio link monitoring in a carrier, and transmits the information regarding the transmission periodicity of the reference signal; and
- a processor that controls transmission of the reference signal for the radio link monitoring based on the configuration information and the information regarding the transmission periodicity of the reference signal.

* * * * *